United States Patent
Qawami et al.

(10) Patent No.: US 8,463,948 B1
(45) Date of Patent: Jun. 11, 2013

(54) METHOD, APPARATUS AND SYSTEM FOR DETERMINING AN IDENTIFIER OF A VOLUME OF MEMORY

(75) Inventors: Shekoufeh Qawami, El Dorado Hills, CA (US); Robert W. Faber, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/175,721

(22) Filed: Jul. 1, 2011

(51) Int. Cl.
  *G06F 3/00* (2006.01)
  *G06F 13/00* (2006.01)

(52) U.S. Cl.
  USPC .............................................. 710/4; 711/100

(58) Field of Classification Search
  USPC ............................................................ 710/4
  See application file for complete search history.

(56) References Cited

U.S. PATENT DOCUMENTS

| | | | | |
|---|---|---|---|---|
| 5,557,553 | A | * | 9/1996 | Sellie, Sr. ...................... 702/176 |
| 6,681,325 | B1 | * | 1/2004 | Marsh et al. ...................... 713/2 |
| 7,480,793 | B1 | * | 1/2009 | Marsh ................................ 713/2 |
| 2006/0271737 | A1 | * | 11/2006 | Green et al. ................... 711/115 |

OTHER PUBLICATIONS

Assign, change, or remove a drive letter, Jan. 21, 2005, Microsoft.*
ONFI, Open NAND Flash Interface Specification, Hynix Semiconductor, Intel Corporation, Micron Technology, Inc., Phison Electronics, Corp., SanDisk Corporation, Sony Corporation, Spansion; Revision 3.0, Mar. 9, 2011, 288 pages.

* cited by examiner

*Primary Examiner* — Hyun Nam
(74) *Attorney, Agent, or Firm* — Blakely, Sokoloff, Taylor & Zafman LLP

(57) ABSTRACT

Techniques for determining an identifier for a volume of memory in a memory device of a computer system. In an embodiment, the memory device detects an indication of an initialization event of the computer system and receives command information after the detecting of the indication. In certain embodiments, the memory device stores an identifier value for association with the volume of memory, wherein the storing is based on whether the received command information specifies that the volume of memory is to be assigned an identifier.

20 Claims, 6 Drawing Sheets

METHOD, APPARATUS AND SYSTEM FOR DETERMINING AN IDENTIFIER OF A VOLUME OF MEMORY

BACKGROUND

1. Technical Field

Embodiments of the invention relate generally to memory device operation. More particularly, certain embodiments relate to techniques for determining an identifier to a volume of memory.

2. Background Art

Computer system architectures often include multiple volumes of memory which, for example, share with one another one or more signal lines coupled to a memory controller. For example, a typical memory system includes one or more buses—e.g. an address bus, data bus and/or command bus—for exchanges between a memory controller and various ones of a plurality of memory devices coupled thereto.

Such memory systems include mechanisms to differentiate volumes of memory from one another—e.g. to differentiate that a particular signal exchange relates to an accessing of one memory volume, as opposed to an accessing of some other memory volume. For example, chip select (or chip enable) inputs of such memory devices may be variously signaled by the memory controller for providing for such differentiation.

In some conventional memory systems, a memory controller assigns different volume addresses each to a respective memory volume. The memory controller may then send one or more such volume addresses in or with a communication—e.g. to indicate which of the memory devices is to service (or ignore) such communication. In current techniques, the assigning of such volume addresses takes place as part of configuration of the computer system—e.g. during, or in response to, a system boot-up.

In order to be configured for operation in such computer systems, memory devices are designed to implement a configuration stage which awaits an assignment of a memory volume identifier which is sent to the memory device—e.g. from the memory controller. However, such a configuration stage limits such memory devices at least with respect to their potential to be used in "instant on" platforms and/or in other applications where platform operation is time-sensitive in terms of memory availability.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein provide techniques and mechanisms for determining an identifier of a memory volume associated with a memory device. In an embodiment, a memory device may include logic for operation in a computer system—e.g. where the memory device is coupled to a memory controller by one or more command bus signal lines. Such a memory device may include logic to detect an initialization event which corresponds to a particular state of the computer system. The state of the computer system may, in an embodiment, be associated with a need to assign an identifier to a volume of memory.

Subsequent to detecting such an initialization event, the memory device may receive command information—e.g. from a memory controller of the computer system. The memory device may include logic to identify whether the received command information specifies that a volume of memory is to be assigned an identifier. Where the received command information is identified as specifying that the volume of memory is to be assigned an identifier, the memory device may store an identifier value for association with the volume of memory, the identifier value based on information received by the memory device after the detecting the initialization event. By contrast, where the received command information is identified as not specifying that the volume of memory is to be assigned an identifier, the memory device may store a default identifier value for association with the volume of memory.

Although the storing of such a default identifier value may, for example, be in response to command information received after an initialization event, the actual default identifier value may, in certain embodiments, be independent of any information received by the memory device after detecting the initialization event.

By variously providing techniques for storing an identifier value received after detecting an initialization event or storing a default identifier value, certain embodiments allow for a memory device to be applied in any of a variety of use cases and/or in any of a variety of computer architectures.

Figure 1:
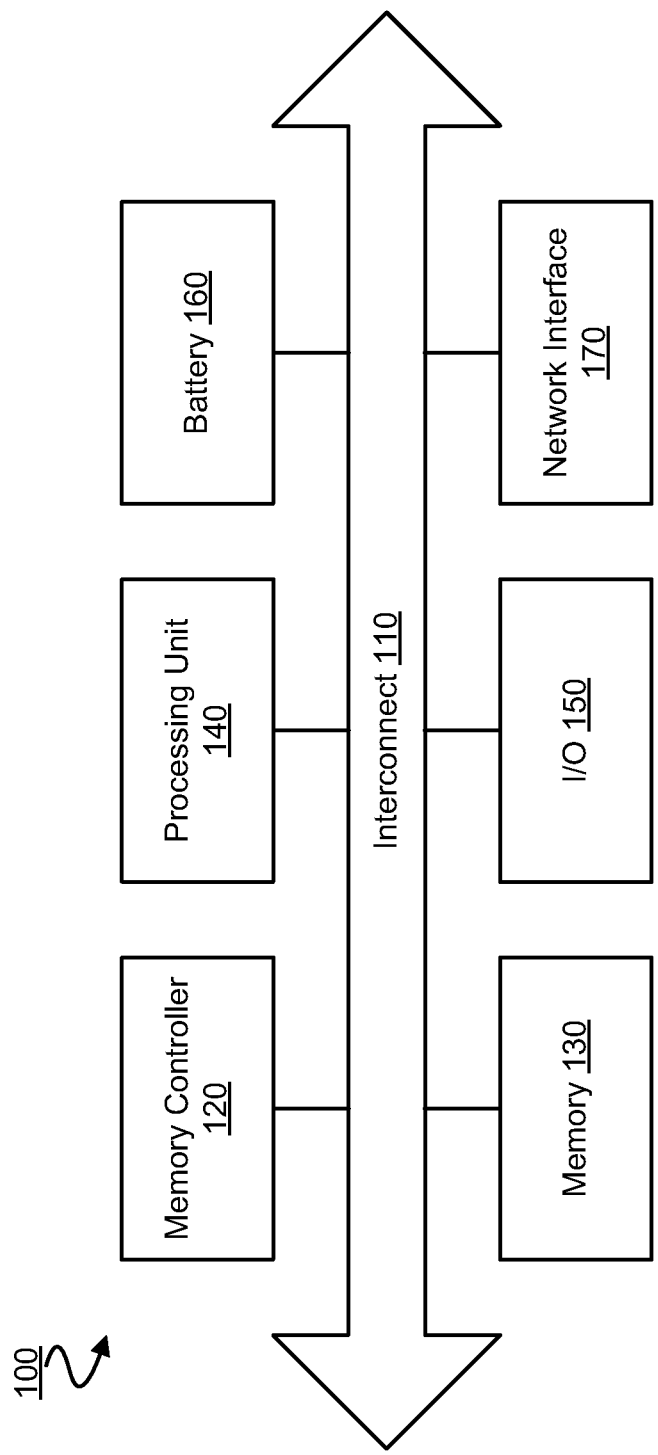
FIG. 1 is a block diagram showing elements of a computer system for determining a memory volume identifier according to an embodiment.

FIG. 1 illustrates select elements of a computer system 100 for determining an identifier for a memory volume according to an embodiment. Computer system 100 may include, for example, a desktop computer, a laptop computer, a handheld or other portable computer such as a tablet, a personal digital assistant (PDA), a smart phone, a messaging device, a digital music player, a digital camera, or other such system capable of processing, storing, transmitting and/or receiving information.

Computer system 100 may include a memory controller 120 and a memory 130 coupled thereto via an interconnect 110. In an embodiment, memory controller 120 may, for example, include control logic, such as that of a memory controller hub (MCH), to control exchanges of data to and/or from memory 130.

Memory 130 may include any of a variety of combinations of one or more devices—e.g. including a non-volatile memory device—which have an array of cells to which data may be written and/or from which data may be read. In one embodiment, memory 130 is a device that is or includes nonvolatile memory cells (not shown) such as those of phase change memory (e.g., PCM, PCMS (phase change memory and switch), or MLC PCM (multi-level cell PCM)).

Basic phase change memory (PCM) cells include chalcogenide glass elements such as an alloy of Germanium-Antimony-Tellurium (GeSbTe), or GST. As with conventional PCM devices, memory 130 may, in an embodiment, store data to PCM cells by variously switching their respective chalcogenide glass elements between crystalline and amorphous states.

PCMS includes multi-layered or stacked PCM cell arrays with a switch, such as a cross point array of PCM cell layered with an ovonic threshold switch (OTS). Thus, PCMS can stack, or place, multiple layers of PCM arrays within a single die. The stacked PCM may also be referred to as vertically integrated memory cell. The ability to layer or stack arrays of PCMs provides the scalability to higher memory densities while maintaining the performance characteristics of PCM. Discussion herein of embodiments including phase change features or products may be extended to apply to any or all of basic PCM, PCMS, MLC PCM and/or the like.

Newer advances in technology, such as with Phase Change Memory (PCM or PCMS), seeks to provide storage that has access speeds—e.g. read speeds—more comparable to volatile memory. The advantage to newer phase change technology such as PCMS is that it might be able to replace both the nonvolatile storage as well as some volatile memory (e.g., a variant of DRAM (dynamic random access memory)). The use of PCMS would change many of the assumptions underlying the use of memory and/or storage, such as the speed and access mechanism assumptions.

PCMS and other recent innovations in phase change technology have the ability to provide several changes in computer system architecture. For example, one or more banks of PCMS devices could be used as a hard drive instead of rotating platter technology, or solid state drive (SSD) instead of using NAND technology for nonvolatile storage. In mobile devices, such as smartphones or tablet devices, a PCMS device could be placed on existing memory buses, changing only the memory controller to a controller as described herein. As described herein, a controller such as that used in the example of the smartphone or tablet is that a controller could be configured (e.g., programmed) to provide either or both of memory and storage access functions. Thus, in one embodiment, PCMS could be used in existing mobile platforms by changing controller logic and enabling integration of the PCMS device onto the platform in place of RAM. Accordingly, in certain embodiments, memory 130 may—for example, in combination with memory controller 120—operate as a solid state drive (SSD) for computer system 100.

Thus, PCMS can provide the advantage of having a nonvolatile storage where previously volatile memory was used. Much larger amounts of memory could be used in systems, which can serve as both memory and storage for the system. The latency of nonvolatile storage access is dramatically reduced to be comparable with that of traditional volatile memory (e.g., —10 ms to tens of nanoseconds for PCMS). Additionally, the power use associated with nonvolatile storage access would be significantly reduced, without having to refresh the memory as is currently done with volatile memory. Both factors would contribute to power savings in a device implementing phase change technology such as PCMS.

Certain embodiments are not limited with respect to the particular type of non-volatile storage medium which is used in the memory device. For example, memory 130 may alternatively or in addition include one or more nanowire-based charge-trapping cells for storing data. The cells may be fabricated, for example, by self-aligning silicon nanowires grown in situ—e.g. on a semiconductor-oxide-nitride-oxide-semiconductor (SONOS) layered structure. Such cells may, for example, include approximately 20 nanometer diameter silicon nanowires surrounded by thin layers of dielectric material for storing electrical charge. Various approaches for implementing nanowire-based non-volatile storage are beginning to emerge.

Interconnect 110 may include any of a variety of combinations of one or more busses, control lines, power planes, voltage traces, vias, and/or the like for variously coupling memory controller 120 and memory 130 to one another and/or to variously couple other components of computer system 100 to one another. By way of illustration and not limitation, computer system 100 may include a processing unit 140, an I/O device 150 (e.g. a keyboard, display, etc.) and/or a network interface 170 which are variously coupled via one or more respective channels of interconnect 110 for variously exchanging information with one another and/or with either or both of memory controller 120 and memory 130.

Processing unit 140 may comprise, for example, one or more processor cores—e.g. one or more microprocessors, digital signal processors, micro-controllers, or the like. I/O device 150 may be used to provide data to and/or receive data from a user—e.g. for exchanging such data with memory 130. Network interface 170 may include any of a variety of combinations of circuit logic to operate one or more wired and/or wireless channels—e.g. for communications between computer system 100 and a network (not shown) coupled thereto. By way of illustration and not limitation, network interface 170 may include one or more of a network interface card (NIC), an antenna, or a wireless transceiver, such as a dipole antenna, although the scope of the present invention is not limited in this respect. In an embodiment, a battery 160 of computer system 100 may be coupled to variously supply power to one or more components.

It should be noted that components of computer system 100 which are coupled to memory controller 120 and memory 130, and the relative configuration of components in computer system 100 with respect to one another, is merely illustrative. One of ordinary skill in the computing arts would appreciate from the discussion herein that any of a variety of additional or alternative combinations of components—and or any of a variety of additional or alternative configurations thereof—may be availed of to implement various embodiments in a computer system. For example, one or more components of computer system 100 may, in certain embodiments, be incorporated together in a single integrated circuit (IC) chip and/or a package of IC chips.

In an embodiment, memory device 130 includes a volume of memory which is to be associated with an identifier specific to that volume of memory. As used herein, a volume of memory (or "memory volume" or simply "volume") refers to a set of one or more addressable memory locations. A memory volume may include, for example, all addressable memory locations in memory 130. Alternatively, a memory volume may include only a subset of addressable memory locations in memory 130. By way of illustration and not limitation, a memory volume may include only addressable memory locations—e.g. all memory cells or a subset thereof—in one IC chip of memory 130. In certain embodiments, a memory volume may include only addressable memory locations in a subset of IC chips in a multi-chip memory package of memory 130.

In an embodiment, an identifier of a memory volume (or simply "memory volume identifier") is distinguished from—e.g. in addition to—addresses of memory locations within that memory volume. A memory volume identifier may identify to memory 130 that other address information is for addressing a location in a particular memory volume—for example, as opposed to that address information being for addressing a location in some other memory volume. Accordingly, a memory volume identifier may include a volume address, in certain embodiments.

In an embodiment, memory 130 includes multiple memory volumes, each to be associated with a respective volume-specific identifier. In an embodiment, two memory volumes of memory 130 share one or more signal lines for communication with memory controller 120. Memory 130 may include logic to determine a memory volume identifier for distinguishing whether a signal of the one or more shared signal lines relates to a particular one of the multiple memory volumes. By way of illustration and not limitation, memory 130 may include logic to determine a memory volume identifier based on a signal provided by memory controller 120 after some indication of an initialization event—e.g. where the initialization event is associated with a need to assign, or otherwise determine, a memory volume identifier.

Figure 2:
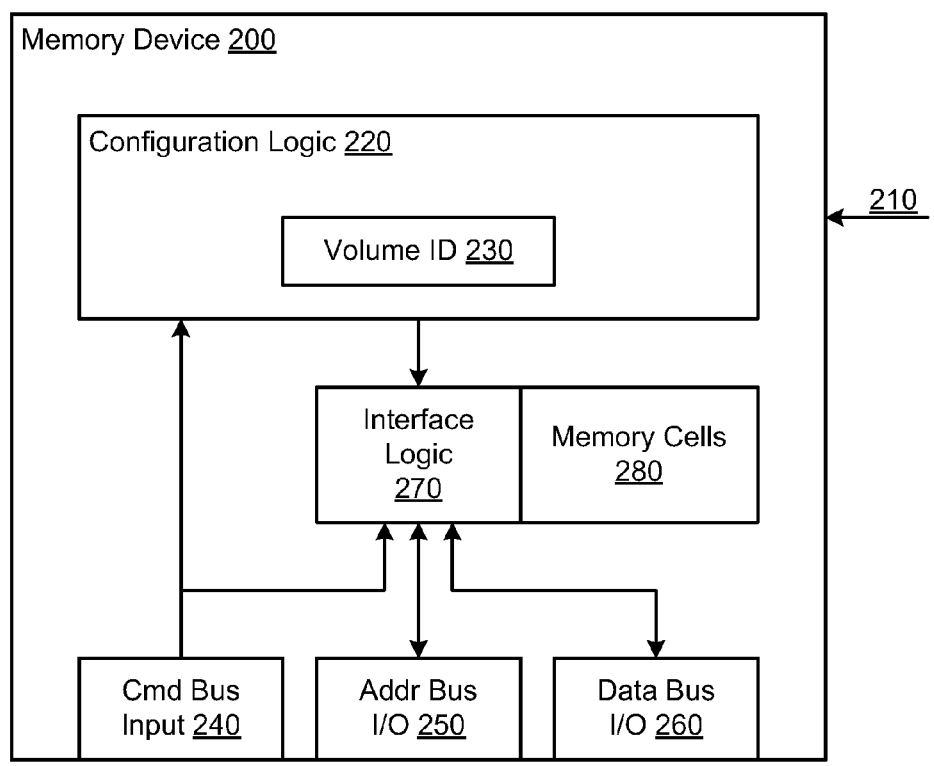
FIG. 2 is a block diagram showing elements of a memory device according to an embodiment.

FIG. 2 illustrates select elements of a memory device 200 for determining a memory volume identifier, according to an embodiment. Memory device 200 may, for example, be capable of operation in a system including some or all of the features of computer system 100. By way of illustration and not limitation, a memory such as memory 130 may include a device having some or all of the features of memory device 200. In order to illustrate some aspects of certain embodiments, features of memory device 200 are discussed herein in the context of operation in such a computer system.

Memory device 200 may include memory cells 280 for storing data to be exchanged in the computer system. Memory cells 280 may, for example, include PCM cells, although certain embodiments are not limited in this regard. In an embodiment, memory device 200 may couple to a memory controller which controls exchanges of data to and/or from memory cells 280. By way of illustration and not limitation, memory device 200 may include one or more of a command bus input 240 through which memory device 200 receives memory controller commands, an address bus input/output (I/O) 250 through which memory device 200 exchanges address information and a data bus I/O 260 through which memory device 200 exchanges data corresponding to such address information. It should be noted that command bus input 240, address bus I/O 250 and data bus I/O 260 are merely illustrative, and are not limiting on certain embodiments. For example, some or all of command bus input 240, address bus I/O 250 and data bus I/O 260 may be combined in a single I/O—e.g. for a common address/data/command bus coupled to the memory controller.

Memory cells 280 may include one or more addressable locations which are part of a memory volume—e.g. where the memory volume is to be associated with a memory volume identifier 230. Memory device 200 may include interface logic 270 to implement the accessing of such locations in the memory volume. By way of illustration and not limitation, interface logic 270 may perform one or more of reads, writes, refreshes and/or other such operations which variously access locations of the memory volume.

Such accessing of the memory volume may, for example, be based at least in part on one or more of command, address, data and/or other such signals which memory device 200 receive from the memory controller. Operation of interface logic 270 may be based on whether or not such command, address, data and/or other signals are for the purpose of accessing the memory volume in question. For example, an accessing of the memory volume may be conditioned upon interface logic 270 receiving a signal which specifies the memory volume. To facilitate such access, interface logic 270 may receive or otherwise determine a volume identifier 230. A subsequent request to access the memory volume may include information—e.g. target volume information—to correspond the request to the volume identifier 230.

Memory device 200 may include configuration logic 220 to determine volume identifier 230. In an embodiment, configuration logic 220 determining volume identifier 230 may be in response to memory device 200 detecting an indication 210 which is generated in response to, or as part of, an initialization event of the computer system. The initialization event may result in, or otherwise correspond to, a state of the computer system in which memory device 200 requires configuring (e.g. reconfiguring) to generate an association of the memory volume with an identifier value.

Indication 210 may, for example, include a supply voltage level, and/or some other voltage characteristic, transitioning to or through some threshold value. Alternatively or in addition, indication 210 may include a chip select signal being asserted for the first time since an interruption of power to memory device 200. In an embodiment, a dedicated signal (e.g. a RESET signal) may specify or otherwise indicate an initialization event has taken place, or it to take place. In an embodiment, an in-band RESET or other command—broadcast to memory devices which have currently no valid or otherwise determined identifier—may specify or otherwise indicate that an initialization event has taken place, or it to take place.

The initialization event may, for example, include a power state transition of the computer system. By way of illustration and not limitation, the initialization event may include a power-up, wake-up or other power state event—for example, where an identifier for the memory volume is invalid, indeterminate, or has otherwise not persisted from a previous powered-up (e.g. awakened) state of the computer system.

As discussed herein, configuration logic 220 may determine volume identifier 230 based on command information which a memory controller has sent to memory device 200. For example, configuration logic 220 may selectively configure volume identifier 230 to a value which has been sent to memory device 200 or to a value which has been generated within memory device 200. In an embodiment, the selective configuring of volume identifier 230 may be based on command information received at memory device 200. Configuration logic 220 may, for example, be coupled to detect such command information through interface logic 270 or directly through command bus interface 240.

Figure 3:
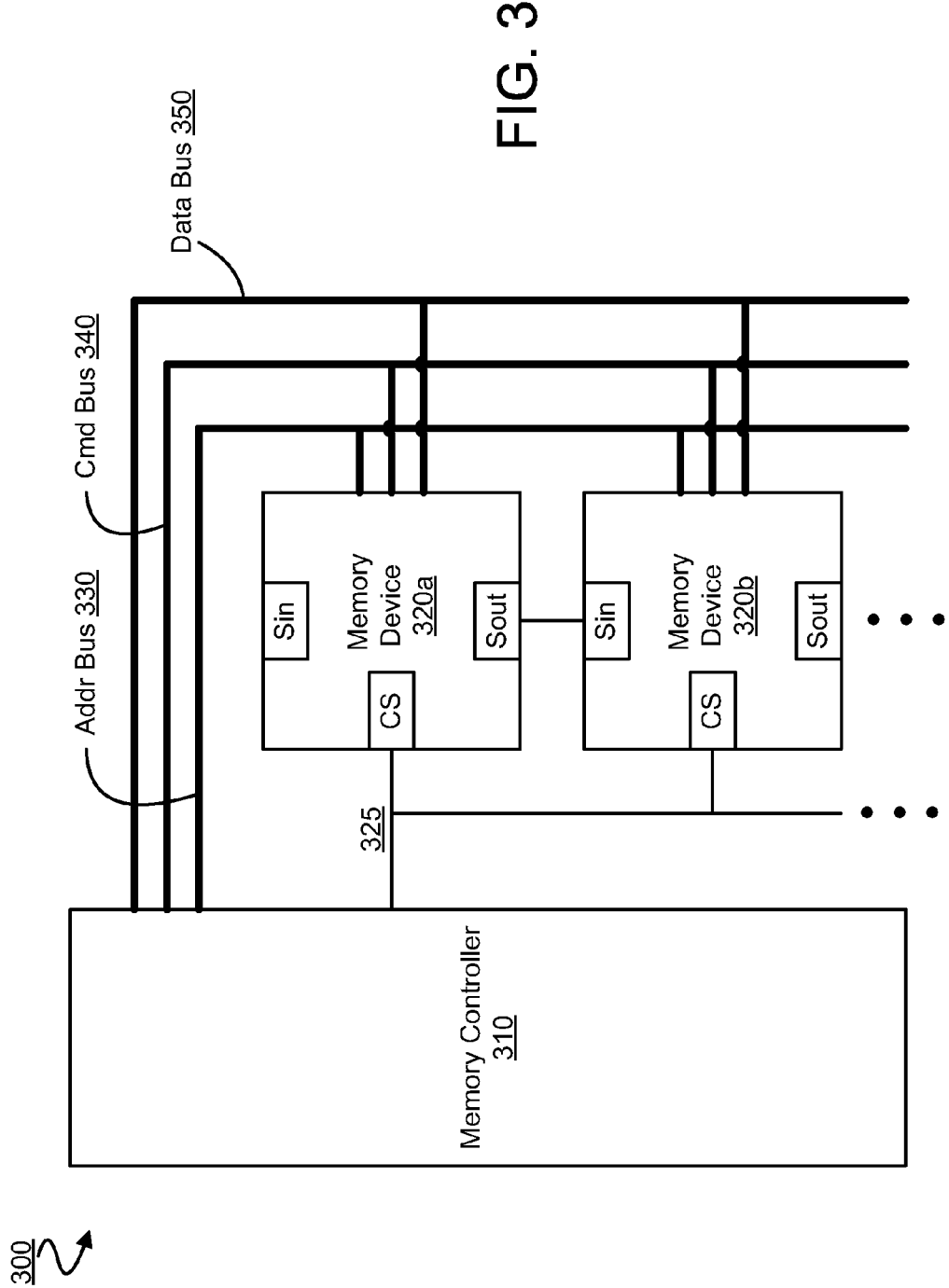
FIG. 3 is a block diagram showing elements of a computer system for determining a memory volume identifier according to an embodiment.

FIG. 3 illustrates select elements of a system 300 for determining a memory volume identifier according to an embodiment. System 300 may, for example, include a memory system such as that of computer system 100. In an embodiment, system 300 comprises, or resides in, a solid state drive device for operation in a computer hardware platform.

System 300 may include a memory controller 310 coupled to a plurality of memory devices, represented by the illustrative memory devices 320a, 320b. In an embodiment, functionality of memory controller 310 and functionality of memory devices 320a, 320b correspond, respectively, to functionality of memory controller 120 and functionality of memory 130. Additionally or alternatively, one or more of memory devices 320a, 320b may, for example, include some or all of the features of memory device 200. Although certain features of system 300 are discussed herein in terms of memory devices 320a, 320b, it is understood that such discussion may be extended to apply to any of a variety of one or more additional or alternative memory devices coupled to a memory controller.

In an embodiment, system 300 includes one or more signal lines which are shared by memory devices 320a, 320b for exchanges with memory controller 310. By way of illustration and not limitation, system 300 may include a bus or buses—e.g. one or more of an address bus 330, command bus 340 and data bus 350—to variously exchange address, command, data and/or other signals between memory controller 310 and either or both of memory devices 320a, 320b. Additionally or alternatively, a chip select line 325 may variously exchange chip select (or chip enable) signals between memory controller 310 and either or both of memory devices 320a, 320b —e.g. the chip select signals to variously indicate at least in part that one or more other signals are to be evaluated by at least some logic in either or both of memory devices 320a, 320b. It is understood that address bus 330, command bus 340, data bus 350 and the chip select line 325 are not limiting on certain embodiments, and that any of a variety of one or more additional or alternative signal lines may be shared by memory devices 320a, 320b, according to various embodiments.

In an embodiment, memory devices 320a, 320b may include one or more memory volumes. To distinguish whether a given signal from memory controller 310 is for implementing an accessing of a particular memory volume—e.g. as opposed implementing an accessing of some other memory volume—either or both of memory devices 320a, 320b may include logic to determine one or more memory volume identifiers.

By way of illustration and not limitation, memory device 320a may determine a memory volume identifier in response to some indication of an initialization event. In an embodiment, memory device 320a may determine the memory volume identifier based on command information which is provided to memory device 320a—e.g. via command bus 340—after memory device 320a detects the indication of the initialization event.

In an embodiment, volume identifiers of system 300 may be determined in sequence along a daisy chain configuration of multiple devices which include memory devices 320a, 320b. For example, a sequence of devices in the daisy chain configuration may include a first device which is permitted to receive a volume identifier assignment. The first device may send a signal indicating that a second device in the sequence is not to receive a volume identifier assignment, which in turn may signal any next device that it is not to receive a volume identifier assignment, and so on. After the first device receives a volume identifier assignment, the second device in the sequence may be signaled by the first device that it is permitted to receive a volume identifier assignment. After it receives a volume identifier assignment, the second device may signal any next device that it is permitted to receive a volume identifier assignment, and so on.

By way of illustration and not limitation, multiple devices including memory devices 320a, 320b may each include respective signal input (Sin) and signal output (Sout) pins (or pads, balls, etc.) variously coupled to daisy chain the multiple devices with one another. When chip select 325 signals that the multiple devices are all enabled, memory device 320a may be prepared to accept a volume identifier assignment from memory controller 310—e.g. due at least in part to memory device 320a not being prevented from doing so by any signal provided at its Sin input. While it is permitted to accept, but before it has actually accepted, some volume identifier assignment, memory device 320a may send a signal from its Sout output to the Sin input of memory device 320b, the signal to prevent memory device 320b from accepting a volume identifier assignment. In turn, memory device 320b may also send a signal via its Sout output that any next downstream device (not shown) to prevent that next device from accepting a volume identifier assignment, and so on.

In response determining a volume identifier, memory device 320a may signal via its Sout that memory device 320b is permitted to accept a volume identifier assignment. Memory device 320b may subsequently accept a volume identifier assignment, and in turn signal via its Sout that any next device is permitted to accept a volume identifier assignment, and so on. In an embodiment, the Sin and Sout signals may, for example, implement functionality similar to that of the ENo and ENi pins of the Open NAND Flash Interface 3.0 specification, Open NAND Flash Interface Working Group, Mar. 15, 2011.

In an alternate embodiment, memory controller 310 may be coupled to a single multi-chip memory device having multiple chip select signals. Such a multi-chip memory device may have a single bus interface which is shared by two or more IC memory chips of the multi-chip memory device.

Figure 4:
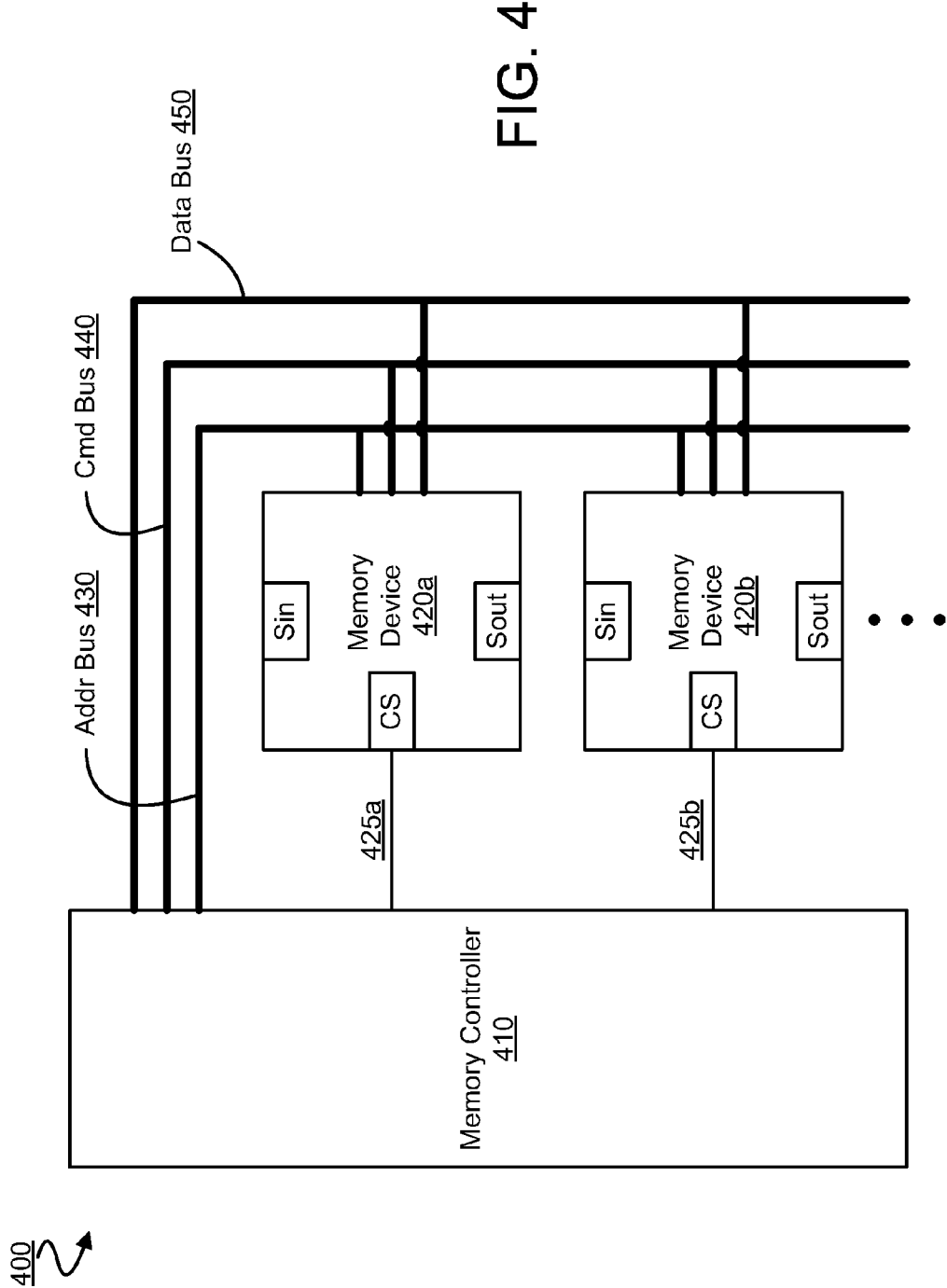
FIG. 4 is a block diagram showing elements of a computer system for determining a memory volume identifier according to an embodiment.

FIG. 4 illustrates select elements of a system 400 for determining a memory volume identifier according to another embodiment. System 400 may, for example, include a memory system such as that of computer system 100. In an embodiment, system 400 comprises, or resides in, a solid state drive device for operation in a computer hardware platform.

System 400 may include a memory controller 410 coupled to one or more memory devices—represented by the illustrative memory devices 420a, 420b—each via a different respective dedicated chip select signal line, such as signal lines 425a, 425b. In an embodiment, functionality of memory controller 410 and functionality of memory devices 420a, 420b correspond, respectively, to functionality of memory controller 120 and functionality of memory 130. Additionally or alternatively, one or more of memory devices 420a, 420b may, for example, include some or all of the features of memory device 200. Although certain features of system 400 are discussed herein in terms of memory devices 420a, 420b, it is understood that such discussion may be extended to apply to any of a variety of one or more additional or alternative memory devices coupled to a memory controller.

Although certain embodiments are not limited in this regard, system 400 may include one or more signal lines which are shared by multiple memory devices for exchanges with memory controller 410. By way of illustration and not limitation, system 400 may include a bus or buses—e.g. one or more of an address bus 430, command bus 440 and data bus 450—to variously exchange address, command, data and/or other signals between memory controller 410 and either or both of memory devices 420a, 420b. It is understood that address bus 430, command bus 440 and data bus 450 are not limiting on certain embodiments, and that any of a variety of one or more additional or alternative signal lines may be shared by memory devices 420a, 420b, according to various embodiments.

In an embodiment, memory devices 420a, 420b may include one or more memory volumes. Since dedicated chip select lines 425a, 425b are provided, signaling to memory volumes of different memory devices 420a, 420b can be distinguished on the basis of chip select signals alone. For example, memory controller 410 may provide information on some or all of address bus 430, data bus 440 and data bus 450 and selectively enable only one of memory devices 420a, 420b to receive and evaluate such information. In such embodiments, it is not necessary for the memory controller to provide memory devices 420a, 420b with identifiers for the memory volumes, where chip select alone can distinguish communications for accessing one memory volume from communications for accessing a different memory volume.

In order to provide an ability to be used in different platforms, certain embodiments include a memory device which capable of operation in either system 300 or system 400. By way of illustration and not limitation, memory device 420a may include logic to configure itself for operation in the absence of memory controller 410 sending an identifier to be associated with a memory volume which includes locations in memory device 420a.

Figure 5:
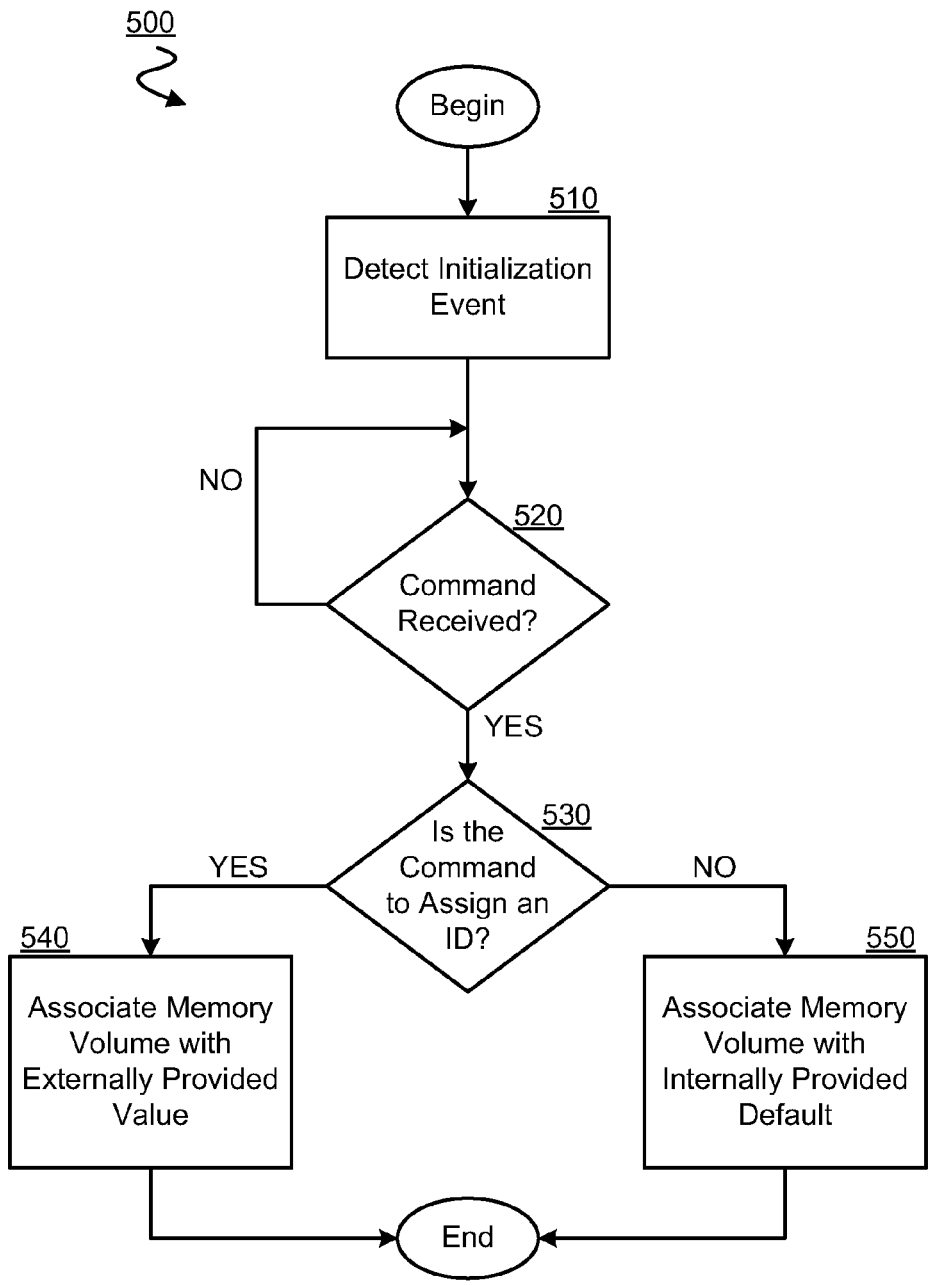
FIG. 5 is a flow diagram showing elements of a method for determining a memory volume identifier according to an embodiment.

FIG. 5 illustrates select elements of a method 500 for determining an identifier for a volume of memory according to an embodiment. Method 500 may, for example, be performed to determine an identifier of a memory volume in a system having some or all of the features of system 100. In an embodiment, method 500 is performed at a memory device—e.g. by logic such as configuration logic 220.

Method 500 may include, at 510, a memory device of a computer system detecting an initialization event of the computer system. The initialization event may, for example, be associated with a state of the computer system in which an identifier for a memory volume of the memory device is unavailable. By way of illustration and not limitation, the memory device may receive one or more signals indicating that the computer system has entered a state in which an identifier of a memory volume does not exist, is valid, indeterminate, has not persisted from a previous powered-up (e.g. awakened) state of the computer system, and/or the like. The indication of the initialization event may include, for example, one or more of a supply voltage of the computer system exceeding some threshold value, a chip select being asserted for the first time since an interruption of power provided to the memory device, and/or the like. It is understood that any of a variety of additional or alternative indications of an initialization event may be detected at 510, according to various embodiments.

Based on the detecting of the initialization, method 500 may begin to detect, at 520, for a command being received at the memory device. By way of illustration and not limitation, method 500 may enter a loop which occasionally polls for one or more command signals being received—e.g. from a memory controller coupled to control the memory device. In an embodiment, the command being polled for at 520 is a first command to be provided to the memory device by the memory controller since the memory device detected the initialization event. Although not shown in method 500, it is understood that any of a variety of combinations of one or more conditions may be a predicate to initiating and/or continuing such determining. For example, the determining may be conditioned upon a chip select being asserted by the memory controller. Alternatively or in addition, the determining may be conditioned upon the memory device not receiving from another memory device—e.g. via an Sin input of the memory device—some signal to prevent such determining. Alternatively or in addition, one or more time-outs, loop count limits, error handling mechanisms, and/or the like may characterize whether and/or how to continue detecting for a received command at 520.

Based on a detecting of a command at 520, method 500 may, at 530, identify whether the command specifies an assigning of an identifier to a memory volume. The command may be, for example, associated with the memory controller sending to the memory device an identifier value to be associated with the memory volume. The command may, for example, direct the memory device to perform a configuration to associate the externally-provided identifier value with the memory volume—e.g. the directing in a manner similar to that of the Set Feature command of the ONFI 3.0 specification.

Alternatively, the command may specify only an operation or operations which are independent of any assigning of an identifier to the memory volume. By way of illustration and not limitation, such a command may specify a read, write, erase, refresh or other such operation which does not inherently include assigning a memory volume identifier. For example, such a command may set only one or more features of the memory device other than any identifier of a memory volume.

Where the command is identified as specifying an assigning of a memory volume identifier, method 500 may, at 540, associate the memory volume with an identifier value which some agent external to the memory device—e.g. the memory controller—has provided. For example, such an identifier value may be included in, or otherwise associated with, the command evaluated at 520. In an embodiment, associating the memory volume with the identifier value may include the memory device storing the value to one or more registers for later access as a reference in distinguishing an accessing one memory volume from an accessing of some other memory volume. The associating the memory volume with the identifier value at 540 may, for example, configure the memory device at least in part for operation in a memory system such as system 300.

Where the command is identified as not specifying an assigning of a memory volume identifier, method 500 may, at 550, associate the memory volume with a default value (e.g. 0x0)—e.g. which the memory device had prior to detecting the initialization event at 510. In an embodiment, associating the memory volume with the identifier value may include the memory device storing the value to one or more registers for later access as a reference in distinguishing an accessing one memory volume from an accessing of some other memory volume. The default value may, for example, include an previously determined, agreed-upon proprietary and/or industry standard default. Although the associating of the default identifier value with the memory volume may be based on the evaluation of a received command, the default value itself may, in an embodiment, be independent of any information in the command. For example, the default value may be available in the memory device, or capable of being generated within the memory device, prior to the command being evaluated at 520. The associating the memory volume with the default identifier value at 550 may, for example, configure the memory device at least in part for operation in a memory system such as system 200.

Figure 6:
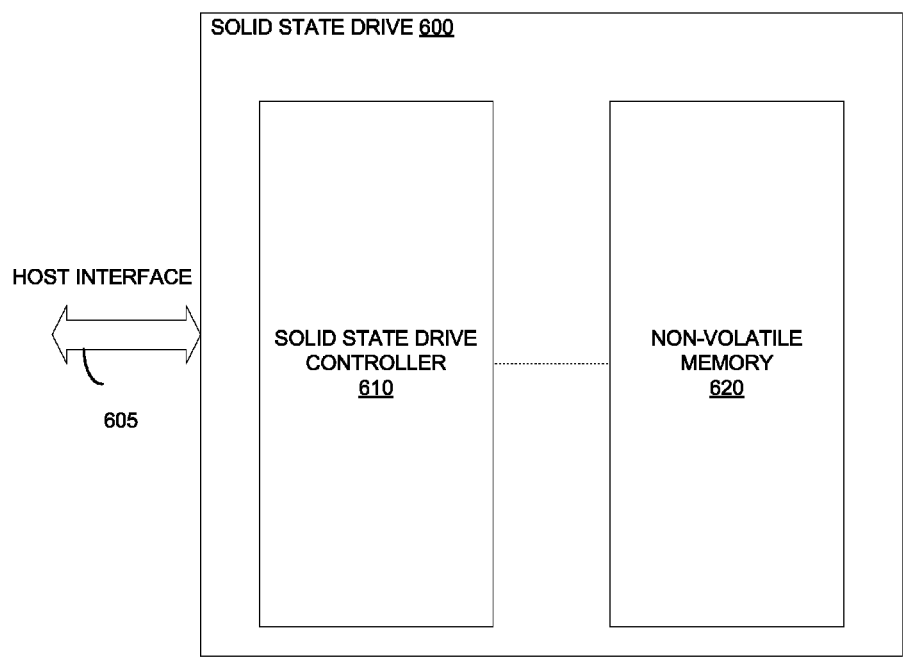
FIG. 6 is a block diagram showing elements of a solid state drive according to an embodiment.

FIG. 6 is a block diagram of an embodiment of a solid state drive 600. Solid state drives (also "solid state disks") use semiconductor memories, also referred to as solid state memories, as a storage medium. Semiconductor memories are comparatively more rugged than hard drives and offer the advantage of being much less sensitive to vibration, dust, humidity, and sudden changes in velocity. Semiconductor memories also tend to require less power than a typical hard drive with similar storage capacity.

Solid state drive 600 may include a solid state drive controller 610 to control nonvolatile memory 620. In an embodiment, solid state drive controller 610 includes some or all of the features of memory controller 120. Alternatively or in addition, solid state drive controller 610 may include some or all of the features of memory controller 310 and/or memory controller 410. Nonvolatile memory 620 may include an array of non-volatile memory cells—e.g. phase-change memory cells. In an embodiment, nonvolatile memory 620 includes some or all of the features of memory 130. Alternatively or in addition, nonvolatile memory 620 may include multiple component memory devices coupled to one another, for example, according to the configuration of memory devices 320a, 320b or, alternatively, according to the configuration of memory devices 420a, 420b. Solid state drive 600 may communicate with a host controller via a host interface 605. The solid state drive controller 610 may control reading, writing and erasing of the nonvolatile memory 620.

Techniques and architectures for operating a memory device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method performed at a memory device, the method comprising:
   detecting an initialization event;
   receiving command information from a memory controller coupled to the memory device, the receiving after the detecting the initialization event;
   identifying whether the received command information specifies that a volume of memory of the memory device is to be assigned an identifier; and
   in response to the identifying:
      where the received command information is identified as specifying that the volume of memory is to be assigned an identifier, storing an identifier value as the identifier assigned to the volume of memory, the identifier value based on information received by the memory device after the detecting the initialization event; and
      where the received command information is identified as not specifying that the volume of memory is to be assigned an identifier, storing a default identifier value as the identifier assigned to the volume of memory.

2. The method of claim 1, wherein the command information is included in an earliest command to be received by the memory device from a memory controller after the detecting the initialization event.

3. The method of claim 1, wherein the memory device includes phase change memory cells.

4. The method of claim 1, wherein the memory device includes an integrated circuit (IC) chip, and wherein the volume of memory includes only memory locations of the IC chip.

5. The method of claim 1, further comprising:
   based at least in part on the command information, sending a signal to indicate that another memory device is permitted to receive a memory volume identifier assignment.

6. The method of claim 1, wherein the initialization event includes a power state transition of a computer system including the memory device.

7. The method of claim 1, wherein the default identifier value is stored as the identifier assigned to the volume of memory, the method further comprising:
   performing an access of the volume of memory according to the command information.

8. The method of claim 7, wherein the accessing the volume of memory is to retrieve a boot operation instruction.

9. The method of claim 1, further comprising:
receiving a chip select signal, wherein the identifying whether the received command information specifies that the volume of memory is to be assigned an identifier is based in part on the received chip select signal.

10. A memory device comprising:
configuration logic to detect an initialization event; and
a command input coupled to the configuration logic, the command input to couple the memory device to a memory controller, the command input further to receive command information from the memory controller after the initialization event is detected by the configuration logic;
the configuration logic further to perform an identification of whether the received command information specifies that a volume of memory of the memory device is to be assigned an identifier, wherein in response to the identification:
where the received command information is identified as specifying that the volume of memory is to be assigned an identifier, the configuration logic to store an identifier value as the identifier assigned to the volume of memory, the identifier value based on information received by the memory device after the initialization event is detected by the configuration logic, and
where the received command information is identified as not specifying that the volume of memory is to be assigned an identifier, the configuration logic to store a default identifier value as the identifier assigned to the volume of memory.

11. The memory device of claim 10, wherein the command information is included in an earliest command to be received by the memory device from a memory controller after the initialization event is detected by the configuration logic.

12. The memory device of claim 10, wherein the memory device includes phase change memory cells.

13. The memory device of claim 10, wherein the memory device includes an integrated circuit (IC) chip, and wherein the volume of memory includes only memory locations of the IC chip.

14. The memory device of claim 10, further comprising:
an output to send, based at least in part on the command information, a signal to indicate that another memory device is permitted to receive a memory volume identifier assignment.

15. The memory device of claim 10, wherein the configuration logic to detect an initialization event includes the configuration logic to detect a power state transition of a computer system which includes the memory device.

16. A system comprising:
a command bus; and
a memory controller to provide command information via the command bus;
a memory device coupled to the memory controller via the command bus, the memory device including:
configuration logic to detect an initialization event; and
a command input coupled to the configuration logic, the command input to receive the command information after the initialization event is detected by the configuration logic;
the configuration logic further to perform an identification of whether the received command information specifies that a volume of memory of the memory device is to be assigned an identifier, wherein in response to the identification:
where the received command information is identified as specifying that the volume of memory is to be assigned an identifier, the configuration to store an identifier value as the identifier assigned to the volume of memory, the identifier value based on information received by the memory device after the initialization event is detected by the configuration logic, and
where the received command information is identified as not specifying that the volume of memory is to be assigned an identifier, the configuration to store a default identifier value as the identifier assigned to the volume of memory.

17. The system of claim 16, wherein the command information is included in an earliest command to be received by the memory device from a memory controller after the initialization event is detected by the configuration logic.

18. The system of claim 16, wherein the memory device includes phase change memory cells.

19. The system of claim 16, wherein the memory device includes an integrated circuit (IC) chip, and wherein the volume of memory includes only memory locations of the IC chip.

20. The system of claim 16, further comprising:
an output to send, based at least in part on the command information, a signal to indicate that another memory device is permitted to receive a memory volume identifier assignment.

* * * * *